Dec. 23, 1952 B. D. LOUGHLIN 2,623,166

SUPERREGENERATIVE SUPERHETERODYNE WAVE-SIGNAL RECEIVER

Filed May 12, 1948 2 SHEETS—SHEET 1

INVENTOR.
BERNARD D. LOUGHLIN

BY John A. Harvey

ATTORNEY

Dec. 23, 1952 B. D. LOUGHLIN 2,623,166

SUPERREGENERATIVE SUPERHETERODYNE WAVE-SIGNAL RECEIVER

Filed May 12, 1948 2 SHEETS—SHEET 2

*INVENTOR.*
BERNARD D. LOUGHLIN

*BY* John A. Harvey
ATTORNEY

Patented Dec. 23, 1952

2,623,166

UNITED STATES PATENT OFFICE 2,623,166

SUPERREGENERATIVE SUPERHETERODYNE WAVE-SIGNAL RECEIVER

Bernard D. Loughlin, Lynbrook, N. Y., assignor to Hazeltine Research, Inc., Chicago, Ill., a corporation of Illinois Application May 12, 1948, Serial No. 26,556

10 Claims. (Cl. 250—20)

Figure 2:
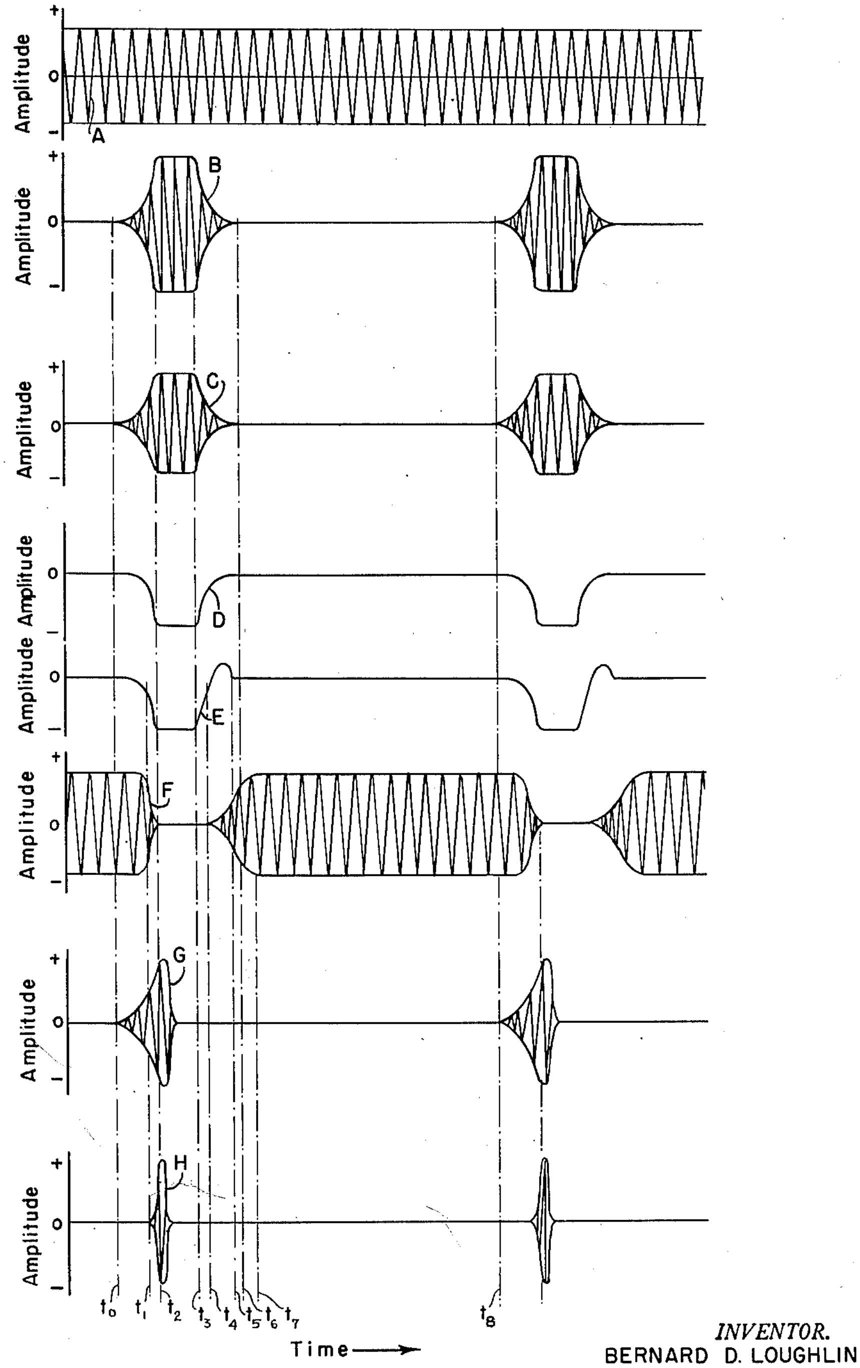

The present invention relates to superregenerative wave-signal receivers and, particularly, to wave-signal receivers of the superregenerative superheterodyne type.

Superregenerative receivers employ a regenerative circuit which is alternately made oscillatory and nonoscillatory at a superaudible rate by application thereto of a periodic quench signal. When this operation is properly carried out, tremendous amplification results. However, in view of the fact that a superregenerative receiver inherently operates as an oscillator during alternate intervals of the quench voltage, undesired radiation of the generated oscillations at the received signal frequency may occur unless precautions are taken to prevent it. Such radiation has a pulse-modulation envelope by virtue of the inherent operation of the superregenerative receiver, and the modulation components may thus occupy a rather extensive portion of the frequency spectrum. This type of radiation consequently may seriously interfere with the operation of other wave-signal receivers located within a range of several miles of the superregenerative receiver. It is this characteristic of the superregenerative receiver which has heretofore frequently prohibited the coupling of the conventional superregenerative receiver directly to the antenna system thereof in those locations wherein the radiation by the receiver would impair reception by near-by receivers. It has been proposed that radiation from a conventional superregenerative receiver be reduced by the provision of one or more stages of radio-frequency amplification by which to couple the antenna system of the receiver to the superregenerative receiver. This expedient, however, has not always been as satisfactory as might be desired. Not only does it require additional circuit complexity, which increases the cost of the receiver, but it has also not proved to be entirely adequate in all instances.

This undesirable characteristic of conventional superregenerative receivers is avoided in substantial part by the superregenerative superheterodyne wave-signal receiver disclosed and claimed in applicant's copending application Serial No. 788,570, filed November 28, 1947, now Patent No. 2,588,022 granted March 4, 1952, entitled "Superregenerative Superheterodyne Wave-Signal Receiver." This superregenerative superheterodyne receiver includes a regenerator tube which has a nonlinear translating characteristic during at least a portion of the oscillatory build-up interval of the regenerative circuit. Such a receiver also includes an oscillator for supplying a heterodyne wave signal to the input circuit of the regenerator tube. The frequency of the heterodyne signal is so related to the frequency of the received wave signal applied to the tuned input circuit of the regenerative circuit that the latter is effective, by virtue of its nonlinear translating characteristic, to derive an intermediate-frequency wave signal. The intermediate frequency is that at which the regenerative circuit itself also operates. Superregenerative amplification of the derived intermediate-frequency signal, which contains the modulation components present in the received wave signal, thus takes place in the superregenerative receiver. The modulation components are derived in the output circuit of the superregenerative receiver.

In the arrangement last described, the intermediate frequency signal derived by the superregenerative superheterodyne wave-signal receiver ordinarily has a value which is considerably different from that of the received wave signal. Hence the tuned input circuit of the receiver, while presenting a high impedance to received wave signals, provides a very low impedance to intermediate-frequency signals. Consequently, only a very small intermediate-frequency potential is developed across the input circuit of the receiver and very little intermediate-frequency energy is available for radiation from the antenna system thereof. Since it is the intermediate-frequency signal which undergoes a high amplification in a superregenerative superheterodyne wave-signal receiver, the fact that very little energy of intermediate frequency is radiated by the antenna system directly coupled to such a receiver represents a very important advantage thereof.

Another receiver, which is similar to the one just described and affords the last-mentioned advantage thereof, includes a separate converter tube, that is responsive to both the received wave signal and the heterodyne wave signal for deriving the desired intermediate-frequency wave signal, followed by a superregenerative circuit including a regenerator tube which superregeneratively amplifies the derived intermediate-frequency wave signal and derives the modulation components thereof. This arrangement is somewhat more complicated and expensive than applicant's receiver above described.

Because both the intermediate-frequency and the heterodyne signals appear in the input circuit of the tube which is performing the heterodying or frequency converting function in such receivers, an undesirable reverse modulation action may take place during the oscillatory interval of the superregenerative circuit due to the nonlinear characteristic of the converter tube. This modulation action produces in the input circuit of the converter tube pulses of wave-signal energy having approximately the frequency of the received wave signal. The described modulation action represents one form of "back conversion." This term is employed to designate a phenomenon which occurs in a superregenerative superheterodyne wave-signal receiver whereby two wave signals present in the receiver, and having intermediate and heterodyne frequencies, are effective to produce in the input circuit of the receiver a resultant wave signal having a frequency approximately equal to that of the received wave signal.

When the regenerator tube of a superregenerative superheterodyne receiver is preceded by an arrangement or stages employing high Q resonant circuits, there may be produced by back conversion a shock excitation or ringing action which causes certain undesirable effects such as a reduction in the sensitivity of the receiver. This constitutes an important reason for the desirability of reducing the extent of back conversion in a superregenerative receiver.

In accordance with one form of the invention disclosed in applicant's Patent 2,588,022, radiation of the last-mentioned type from a superregenerative superheterodyne receiver has been reduced by employing a blocking oscillator for periodically generating the heterodyne signal. The maximum amplitude of the intermediate-frequency oscillations then can occur during the intervals when the blocking oscillator is not generating wave-signal energy. This substantially reduces any tendency of the derived intermediate-frequency signal to combine with a heterodyne signal from the blocking oscillator to develop by back conversion a wave signal having a frequency approximately equal to that of the received wave signal.

It is an object of the present invention to provide a new and improved superregenerative superheterodyne wave-signal receiver which reduces the amount of the wave-signal energy produced by back conversion.

It is another object of the invention to provide a new and improved superregenerative superheterodyne wave-signal receiver which requires only relatively simple and inexpensive components for reducing back conversion producing wave-signal energy having approximately the frequency of the received wave signal.

It is a further object of the invention to provide a new and improved superregenerative superheterodyne wave-signal receiver which is effective to reduce back conversion producing an undesirable ringing of high Q resonant circuits preceding the regenerator tube of the receiver.

In accordance with a particular form of the invention, a superregenerative superheterodyne wave-signal receiver comprises a superregenerative superheterodyne system having a nonlinear wave-signal translating characteristic and including a superregenerative circuit having an oscillatory frequency different from that of a received wave signal applied to the above-mentioned system. The superregenerative circuit includes quench means coupled thereto for applying thereto a quench signal which produces alternate positive and negative conductance variations therein and effects superregenerative amplification. The receiver also includes an oscillator coupled to the portion of the system having the aforesaid characteristic and having parameters so proportioned as to apply to the system a heterodyne wave signal having a frequency differing from that of the received wave signal substantially by the value of the oscillatory frequency to derive in the system from the received wave signal and the heterodyne wave signal by virtue of the aforesaid nonlinear characteristic a wave signal having substantially the oscillatory frequency, whereby the superregenerative circuit effects superregenerative amplification of wave signals having substantially the oscillatory frequency. The system has an input circuit coupled to the aforesaid portion of the system and exhibiting variations in the input impedance thereof during the oscillatory interval of the superregenerative circuit, whereby the variations in the input impedance undesirably tend to modulate the heterodyne wave signal producing by back conversion wave-signal energy having substantially the frequency of the received wave signal. The receiver also includes a feed-back impedance coupled in circuit with the aforesaid portion of the system and degenerative with relation to a wave signal having substantially the frequency of the received wave signal and responsive to the operation of the superregenerative circuit during the oscillatory interval thereof for reducing the aforesaid undesirable variations in the input impedance during the oscillatory interval, thereby substantially reducing the wave-signal energy produced by back conversion.

For a better understanding of the present invention, together with other and further objects thereof, reference is had to the following description taken in connection with the accompanying drawings, and its scope will be pointed out in the appended claims.

Figure 1:
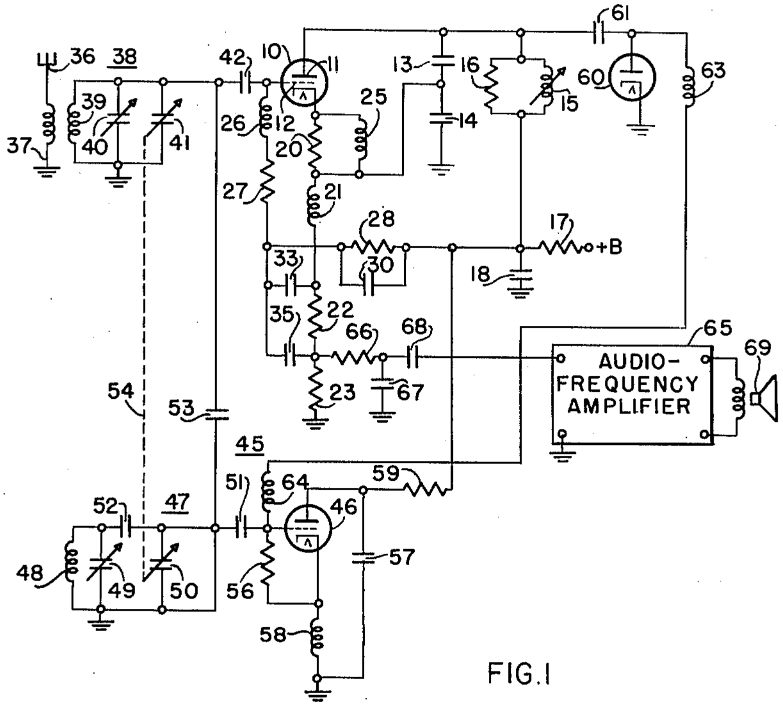
Figure 3:
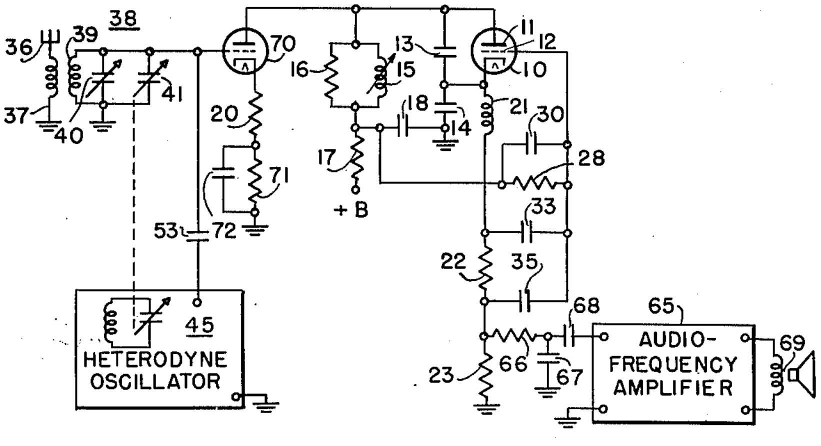

Referring now to the drawings, Fig. 1 is a circuit diagram, partly schematic, of a complete superregenerative superheterodyne wave-signal receiver embodying the present invention in a particular form; Fig. 2 is a graph representing certain operating characteristics of the Fig. 1 receiver and is utilized in explaining the operation thereof; and Fig. 3 is a circuit diagram, partly schematic, of a superregenerative superheterodyne wave-signal receiver in accordance with a modified form of the invention.

Referring now more particularly to Fig. 1 of the drawings, the superregenerative superheterodyne wave-signal receiver there represented comprises a superregenerative superheterodyne system having a nonlinear wave-signal translating characteristic. The system includes a superregenerative circuit, and this circuit may comprise one which is arranged for operation in the saturation-level mode or one which is adapted to operate in the linear mode. The circuit shown is of the type for operation in the saturation-level mode. This circuit has an oscillatory frequency different from, and preferably lower than, the frequency of a received wave signal applied to the system. It comprises a regenerator tube 10 having an anode 11 and a control electrode 12 which are effectively coupled, in a manner to be described hereinafter, across a frequency-determining circuit having a resonant frequency corresponding to the aforementioned oscillatory frequency of the superregenerative circuit. The frequency-determining circuit includes condensers 13 and 14, which are connected in series between the anode 11 of the tube 10 and ground, and an inductor 15 which is connected between the anode 11 and a potential source indicated as +B through a resistor 17. The junction of the resistor 17 and the inductor 15 is connected to ground through a by-pass condenser 18. A damping resistor 16 is included in the frequency-determining circuit and is connected in shunt with the inductor 15 to provide sufficient positive damping within the frequency-determining circuit during each positive conductance interval thereof.

The cathode of the tube 10 is coupled to ground through a series-connected network comprising a feed-back impedance or cathode resistor 20, more fully to be described hereinafter, a radio-frequency choke coil 21 which presents a high impedance to wave signals having a frequency corresponding to the oscillatory frequency of the superregenerative circuit, a resistor 22, and a load resistor 23. A radio-frequency choke coil 25, which presents a high impedance to wave signals having substantially the frequency of received wave signals applied to the superregenerative system in a manner to be described subsequently, is connected in shunt with the resistor 20 to provide a greater modulation-signal output. The junction of the choke coils 21 and 25 is coupled to the junction of the condensers 13 and 14. The control electrode 12 of the tube 10 is coupled to the potential source +B through a radio-frequency choke coil 26 and series-connected resistors 27, 28, and 17. The radio-frequency choke coil 26 has a high impedance to wave signals having substantially the frequency of the received wave signal. The resistor 27 has a value sufficient to suppress parasitic oscillations. A by-pass condenser 30 is connected in shunt with the resistor 28.

The superregenerative circuit further includes quench means for controlling the conductance variations of the regenerative circuit to provide superregenerative operation in the saturation-level mode. This means may be either a separate quench oscillator or a suitable network by which to enable self-quenching of the regenerative circuit. By way of example, a self-quench network is employed in the receiver represented in Fig. 1. Although the self-quench network may be included as desired in the anode, control electrode, or cathode circuits of the regenerator tube 10, it is conveniently arranged in the cathode circuit as shown in Fig. 1 and comprises the resistor 22 and a condenser 33 coupled across the latter through a condenser 35. One terminal of the condenser 33 is coupled to the junction of the resistor 22 and the choke coil 21 while the other terminal is coupled to the junction of the resistors 27 and 28.

Grid circuit stabilization of the operating characteristics of the superregenerative circuit, against variations in operating conditions which tend to modify its average self-quench period, is provided by a resistor-condenser network comprising the resistor 28 and the condenser 35. The latter is coupled to the junction of the resistors 22 and 23 and to the junction of the resistors 27 and 28. Grid circuit stabilization of this type is disclosed and claimed in the copending application of Donald Richman, Serial No. 788,765, filed November 28, 1947, entitled "Self-Quench Superregenerative Receiver." Additional stabilization is afforded by a cathode-stabilizing network comprising the condenser 35 and the resistor 23.

Stabilizing networks of the latter type are disclosed and claimed in applicant's copending application Serial No. 753,236, filed June 7, 1947, entitled "Superregenerative Receiver."

A wave signal intercepted by an antenna system 36, 37 is applied to the input electrodes of the regenerator tube 10 of the superregenerative superheterodyne system by way of a tunable radio-frequency selector 38. The selector 38 comprises an inductor 39, a trimmer condenser 40, and a tuning condenser 41. One terminal of the selector 38 is grounded while the other terminal thereof is connected to the control electrode 12 of the regenerator 10 through a coupling condenser 42.

The receiver also includes an oscillator 45 for applying to the superregenerative superheterodyne system thereof a heterodyne wave signal having a frequency so related to the frequency of the received signal that a wave signal having a frequency substantially equal to the oscillatory frequency of the regenerative circuit is derived in the system. The derived wave signal is superregeneratively amplified in the superregenerative circuit. For convenience, this derived wave signal will be referred to hereinafter as an intermediate-frequency signal. The oscillator 45 is of conventional construction and includes a triode electron tube 46 coupled to a frequency-determining circuit 47 comprising an inductor 48 connected in parallel with a trimmer condenser 49 and also connected in parallel with a tuning condenser 50 through a fixed condenser 52. One terminal of the frequency-determining circuit 47 is coupled to the control electrode of the tube 46 through a coupling condenser 51 while the other terminal is grounded. The frequency-determining circuit of the oscillator 45 is coupled to the control electrode 12 of the regenerator tube 10 through a coupling condenser 53. The tuning condensers 41 and 50 are mechanically connected, as indicated by the broken line 54, for unicontrol operation in a conventional manner. The control electrode of the tube 46 is connected to the cathode thereof through a resistor 56 while the anode thereof is connected to the ground through a by-pass condenser 57. The cathode of the tube 46 is grounded through a radio-frequency choke coil 58. The anode of the tube 46 is also connected to the source of energizing potential +B through a resistor 59 and the resistor 17.

The regenerator tube 10 exhibits inherent but undesirable variations in the input impedance thereof during the oscillatory interval of the superregenerative circuit. These variations are essentially capacitive variations. Accordingly, the receiver includes a feed-back impedance responsive to the operation of the superregenerative circuit during the oscillatory interval thereof for reducing these undesirable variations at least during the oscillatory build-up interval. This substantially reduces, at least during the oscillatory build-up interval, undesirable back conversion producing wave-signal energy having substantially the frequency of the received wave signal. The feed-back impedance comprises the cathode resistor 20 for the regenerator tube 10, which resistor is effectively unby-passed for signals having substantially the frequency of the received wave signals. The choke coil 25 which is connected in parallel with the resistor 20 has a low-impedance value for direct-current and for quench-frequency signals but has a significant value of impedance for signal components having a frequency substantially equal to the received signal.

The wave-signal receiver preferably includes a control circuit responsive to the operation of the superregenerative circuit during the saturation-level interval thereof for controlling the oscillator 45 to reduce the amplitude of oscillation thereof during the saturation-level interval. This control also substantially reduces, during the saturation-level interval, undesirable back conversion producing wave-signal energy having substantially the frequency of the received wave signal. Superregenerative superheterodyne wave-signal receivers including control circuits of this character are disclosed and claimed in applicant's copending application Serial No. 26,555, filed concurrently herewith, entitled "Superregenerative Superheterodyne Wave-Signal Receiver" which application is now abandoned. This control circuit includes a diode rectifier tube 60, the anode of which is coupled to the anode of the regenerator tube 10 through a coupling condenser 61 while the cathode thereof is connected to ground. The anode of the tube 60 is also coupled to the control electrode of the tube 46 through two series-connected radio-frequency choke coils 63 and 64, the choke coil 63 presenting a high impedance to intermediate-frequency wave signals produced in the superregenerative circuit and the choke coil 64 presenting a high impedance to the wave signals developed by the oscillator 45.

Modulation components of the received wave signal are derived across the cathode resistor 23 by the operation of the superregenerative superheterodyne system and are coupled to an audio-frequency amplifier 65 through a conventional resistor-condenser filter network 66, 67 and a coupling condenser 68. Amplifier 65 has an output circuit which is coupled to a signal-reproducing device such as a loudspeaker 69.

Considering now the operation of the wave-signal receiver just described, but neglecting for the moment the action of the cathode resistor 23 and assuming that the control circuit including the tube 60 is temporarily de-energized, the oscillator 45 then generates continuous wave oscillations of the type represented by curve A of Fig. 2. These oscillations are applied as a heterodyne wave signal through the condenser 53 to the input electrodes of the regenerator tube 10. The received wave signal from the antenna system 36, 37 is also applied through the wave-signal selector 38 to the input electrodes of the regenerator tube 10. The energizing potential supplied to the superregenerative circuit from the source indicated as +B permits oscillations to build up in the regenerative circuit, in the manner shown by curve B, during the oscillatory build-up interval $t_0$—$t_2$. The nonlinear translating characteristic of the regenerator tube 10 during at least the start of each oscillatory build-up interval causes the derivation, in the output circuit of the tube and by heterodyne action from the received and heterodyne wave signals, of an intermediate-frequency wave signal having approximately the oscillatory frequency of the frequency-determining circuit 13, 14, and 15. The derived signal is then amplified in conventional manner by the superregenerative operation of the system. The circuit parameters are so selected that the intermediate-frequency oscillations reach an approximate equilibrium amplitude value at time $t_2$ and remain thereat for the duration of the saturation-level interval $t_2$—$t_3$. During this last-mentioned interval the potential developed across the condenser 33 from the anode current of the tube 10 acquires a value sufficient to bias the tube to anode-current cutoff, thereby terminating the saturation-level interval and initiating an oscillation decay interval $t_3$—$t_6$. As the charge accumulated in the condenser 33 is dissipated by the resistor 22, the voltage across the condenser decreases to a sufficiently low value that the tube 10 is again enabled to become conductive at time $t_8$, thus initiating a new cycle of self-quench operation similar to that just described.

As previously mentioned, the resonant frequency-determining circuit 13, 14, and 15 of the superregenerative circuit responds to the derived intermediate-frequency wave signal and the latter is thus subjected to superregenerative amplification. As more fully explained in applicant's above-mentioned application Serial No. 753,236, the self-quench period of the superregenerative circuit varies dynamically in accordance with the amplitude modulation of the derived intermediate-frequency wave signal and hence in accordance with the amplitude modulation of the received wave signal. These dynamic variations of the quench rate are manifest as dynamic variations in the anode current of the regenerator tube 10. Accordingly, a voltage which varies in accordance with the derived modulation components is developed across the cathode resistor 23 for application through the filter network 66, 67 and the coupling condenser 68 to the audio-frequency amplifier 65 for amplification therein and translation to the loudspeaker 69.

As more fully explained in the above-mentioned application Serial No. 783,765 of Donald Richman, variations in the average amplitude of the wave signal applied to the wave-signal selector 38 by the antenna system 36, 37 and variations in operating conditions such as changes in anode energizing potential and the transconductance of the tube 10 undesirably tend to modify the average self-quench periodicity of the receiver. However, the resistor-condenser network 28, 35, which is responsive to the control-electrode current flowing therein only during each saturation-level interval of the superregenerative circuit, develops and applies to the control electrode of the regenerator tube 10 a gain-control potential which is effective to maintain the average control-electrode current and the average self-quench frequency substantially constant, thereby stabilizing the operating characteristics of the receiver against variations of the type mentioned above. As more fully explained in applicant's above-mentioned application Serial No. 753,236, the stabilizing network 23, 35 responds to the anode current of the tube 10 and applies to the control electrode thereof a gain-control potential which also provides a stabilizing action similar to that afforded by the network 28, 35.

Under the assumed condition that a heterodyne wave signal is continuously applied to the superregenerative system and since the latter operates in the saturation-level mode, both intermediate-frequency and heterodyne wave signals appear in the input circuit of the regenerator tube and a modulation action takes place during the oscillatory interval of the superregenerative circuit due to the nonlinear characteristic of the tube 10. This action causes undesirable back conversion which produces pulses of wave-signal energy, having substantially the frequency of the received wave signal, as represented by curve C which, for convenience of illustration, has been drawn to a scale of ordinates greatly magnified in comparison with that of curve B. This energy is applied to the selector 38 so that, under the assumed conditions, energy may be radiated by the antenna system 36, 37.

The operation of the superregenerative superheterodyne wave-signal receiver with the control circuit including the tube 60 performing its desired function is described in detail in applicant's aforementioned abandoned application Serial No. 26,555. Briefly considered for purposes of the present explanation, and neglecting for the moment the action of the cathode resistor 20 provided in accordance with the present invention, the intermediate-frequency wave-signal pulse developed during the interval $t_0$—$t_6$ across the resonant circuit 13, 14, and 15, and having the wave form represented by curve B of Fig. 2, is applied to the tube 60 through the coupling condenser 61. The envelope of this pulse is rectified by the tube and a unidirectional-current pulse of negative polarity, represented by curve D, flows through the load resistor 56. As a result, a negative voltage pulse having the wave form represented by the corresponding pulse of curve E supplements the relatively small negative bias normally present on the control electrode of the tube 46 of the heterodyne oscillator 45. The effect of this negative voltage pulse is to reduce the amplitude of the oscillations generated by the oscillator 45 during the interval $t_1$—$t_7$ as shown by curve F of Fig. 2. Consequently, a material reduction in the amplitude of the heterodyne oscillations generated by the oscillator 45 occurs during the saturation-level interval $t_2$—$t_3$. By virtue of this, back conversion which produces energy at a frequency substantially equal to that of a received wave signal is almost entirely eliminated during the saturation-level interval. The amount or extent of the wave-signal energy which is still produced by back conversion is represented graphically by curve G. It will be manifest from this curve that such energy now occurs primarily during the oscillatory build-up interval $t_0$—$t_2$. A small amount of such energy still remains during the initial portion of the saturation-level interval $t_2$—$t_3$ due to the fact that the heterodyne oscillations are not suppressed instantaneously by the control potential produced during this interval by the tube 60. However, by comparing curves G and C, it will be apparent that a very material reduction in the back conversion to wave-signal energy having substantially the frequency of the received wave signal results.

During at least the oscillatory build-up interval $t_0$—$t_2$, applicant has determined that wave-signal energy having the approximate frequency of the received wave signal is produced across the selector 38 because of undesirable variations in the input impedance of the regenerator tube 10. These impedance variations may essentially comprise capacitance variations which result from changes in the anode current of the tube 10 during each oscillatory interval, the variations thus occurring at an intermediate-frequency rate. As the oscillations continue to build up in valve during an oscillatory interval, the apparent input capacitance of the tube 10 varies in magnitude to a progressively greater extent. These variations in the input capacitance of the regenerator tube 10, during at least the oscillatory build-up interval $t_0$—$t_2$, are effective to modulate at intermediate frequency the heterodyne wave signal applied to the input circuit of the tube 10 by the oscillator 45, thereby producing wave-signal energy having the approximate frequency of the received wave signal. The energy produced by this back-conversion phenomenon is applied to the selector 38 so that it is applied to the antenna system 36, 37 for radiation thereby. Such wave-signal energy produced by back conversion during the oscillatory build-up interval $t_0$—$t_2$ augments that produced during the initial portion of the oscillatory build-up interval and is represented by curve G of Fig. 2.

Consider now the operation of the superregenerative receiver of the present invention with the cathode resistor 20 included in the circuit thereof. Since the resistor 20 is effectively unby-passed for signals having substantially the frequency of the received wave signal, it is degenerative with respect to such signals during the oscillatory build-up interval $t_0$—$t_2$. Consequently, as the anode current of the regenerator tube increases during the oscillatory build-up interval, the current through the cathode resistor 20 increases, thus tending to maintain the input capacitance of the tube substantially constant during the last-mentioned interval. This in turn substantially avoids any modulation at an intermediate-frequency rate of the heterodyne wave signal caused by the changing input electrode impedance of the regenerator tube 10. The undesirable back conversion during the interval $t_0$—$t_2$ is thus reduced to a very small value, as represented by curve H. Consequently, the wave-signal energy available for radiation by the antenna system 36, 37 is very small and essentially constitutes but a very small pulse of energy occurring during each quench cycle of the superregenerative system. As a result, the operation of near-by wave-signal receivers is substantially unaffected by radiation from a superregenerative wave-signal receiver embodying the present invention. Since the choke coil 25 connected in shunt with the resistor 20 has a low impedance for audio-frequency components of the translated signal, it permits the superregenerative superheterodyne system to develop an output signal of large amplitude.

It will be apparent from the foregoing description of the invention that reception of amplitude-modulated wave signals is accomplished by tuning the frequency-determining circuit 13, 14, and 15 to the carrier component of the derived intermediate-frequency signal resulting from the heterodyning of the received wave signal and the heterodyne wave signal applied by the oscillator 45. It will also be manifest that a receiver of this type is adapted to receive frequency-modulated wave signals. For this purpose, the resonant circuit 13, 14, and 15 is side tuned to the derived intermediate-frequency wave signal. Thus, in both the amplitude modulation and the frequency-modulation versions of the present invention, when it is stated that the applied heterodyne wave signal has a frequency differing from that of the received wave signal substantially by the value of the oscillatory or intermediate frequency, it is meant that the frequency difference just mentioned lies within a frequency range defined by the oscillatory frequency plus or minus a frequency of the order of the modulation side band of the received wave signal. If desired, a separate oscillator may be employed to supply the quench voltage necessary to provide the superregenerative type of operation.

While applicant does not intend to limit the invention to any particular values of circuit constants, the following values have been found suitable for the embodiment of the invention represented in Fig. 1:

| | |
|---|---|
| Superregenerative circuit: | |
| Tube 10 | ½ of a type 12AT7. |
| Resistors 16 and 23 | 22,000 ohms. |
| Resistor 17 | 1,000 ohms. |
| Resistor 20 | 120 ohms. |
| Resistor 22 | 820 ohms. |
| Resistor 27 | 100 ohms. |
| Resistor 28 | 180,000 ohms. |
| Resistor 66 | 100,000 ohms. |
| Condensers 13 and 14. | 25 micromicrofarads. |
| Condenser 18 | 40 microfarads. |
| Condensers 30 and 33. | 5,000 micromicrofarads. |
| Condenser 35 | 10 microfarads. |
| Condenser 42 | 500 micromicrofarads. |
| Condenser 53 | 2 micromicrofarads. |
| Condenser 67 | 1,000 micromicrofarads. |
| Condenser 68 | 0.02 microfarad. |
| Tuning range of selector 38. | 88–108 megacycles. |
| Resonant frequency of circuit 13, 14, and 15. | 21.75 megacycles. |
| Approximate quench frequency. | 30 kilocycles. |
| +B | 100 volts. |
| Heterodyne oscillator 45: | |
| Tube 46 | ½ of a type 12AT7. |
| Resistor 56 | 22,000 ohms. |
| Resistor 59 | 100 ohms. |
| Condenser 51 | 20 micromicrofarads. |
| Condenser 52 | 50 micromicrofarads. |
| Condenser 57 | 500 micromicrofarads. |
| Tuning range | 109.75–129.75 megacycles. |
| Control circuit: | |
| Tube 60 | Type 12AT6. |
| Condenser 61 | 10 micromicrofarads. |

Referring now to Fig. 3 of the drawings, there is represented a superregenerative superheterodyne wave-signal receiver embodying the invention in a modified form which is generally similar to that represented in Fig. 1, corresponding elements being designated by the same reference numerals. The receiver represented in Fig. 3 includes a separate converter tube 70, the input electrodes thereof being coupled to the tunable radio-frequency selector 38 and the output electrodes thereof being coupled to the frequency-determining circuit 13, 14, and 15 of the regenerator tube 10. The resistor 20, instead of being connected in the cathode circuit of the regenerator tube 10 as in the Fig. 1 embodiment, comprises a cathode resistor for the converter tube 70 and is unby-passed for signals having substantially the frequency of the received wave signal. A parallel-connected resistor-condenser network 71, 72 is connected between one terminal of the cathode resistor 20 and ground to provide a self-bias potential for the tube 70 which is sufficient to prevent the flow of control-electrode current therein. The heterodyne oscillator 45 may be of the type which generates either continuous wave signals or may be a blocking oscillator for producing wave-signal pulses for application to the input circuit of the converter tube 70.

Considering briefly the operation of the receiver represented in Fig. 3, but neglecting for the moment the action of the cathode resistor 20, the converter tube 70 as a result of its nonlinear signal-translating characteristic is effective to derive in its output circuit an intermediate-frequency wave signal from the received wave signals and the heterodyne wave signals which are applied to the input circuit thereof. This intermediate-frequency wave signal is applied to the regenerator tube 10 of the superregenerative superheterodyne system and is amplified in a conventional manner by the superregenerative operation thereof. A voltage which varies in accordance with the modulation components of the received wave signal is developed across the cathode resistor 23 and is applied through the filter network 66, 67 and the condenser 68 to the audio-frequency amplifier 65 for amplification therein and translation to the loudspeaker 69. Since the voltage developed across the output circuit of the tube 70 is varying at an intermediate frequency during the oscillatory interval of the superregenerative circuit, the space current of the tube 70 also varies at the same frequency. This space-current variation is effective to vary the input capacitance of the tube 70 at an intermediate frequency, thereby producing by back conversion undesirable wave-signal energy having substantially the frequency of the received wave signal.

Consider now the operation of the receiver of Fig. 3 with the cathode resistor 20 in the circuit of the converter tube 70. The resistor 20 is effective, by its degenerative action with respect to those wave signals having substantially the frequency of the received wave signals, to maintain the input capacitance of the tube 70 substantially constant. This in turn substantially avoids any modulation at intermediate frequency of the heterodyne wave signals as otherwise caused by the varying input capacitance of the converter tube 70. Hence, wave-signal energy produced by back conversion is substantially reduced and the ringing of high Q resonant circuits preceding the regenerator tube is also substantially avoided.

It will be apparent from the foregoing description that a superregenerative superheterodyne wave-signal receiver embodying the present invention may be coupled directly to the antenna system thereof since there is developed by any back conversion only an extremely small amount of wave-signal energy which can be radiated by the antenna system. It will also be manifest that a superregenerative superheterodyne wave-signal receiver embodying the present invention is effective to reduce back conversion producing an undesirable ringing of high Q resonant circuits preceding the regenerator tube of the receiver. It will also be clear that a superregenerative superheterodyne wave-signal receiver in accordance with the present invention employs only simple and inexpensive components for reducing back conversion which undesirably produces wave-signal energy having substantially the frequency of the received wave signal.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A superregenerative superheterodyne wave-signal receiver comprising: a superregenerative superheterodyne system having a nonlinear wave-signal translating characteristic and including a superregenerative circuit having an oscillatory frequency different from that of a received wave signal applied to said system; quench means coupled to said super-regenerative circuit for applying thereto a quench signal which produces alternate positive and negative conductance variations therein and effects superregenerative amplification; an oscillator coupled to the portion of said system having said characteristic and having parameters so proportioned as to apply to said system a heterodyne wave signal having a frequency differing from that of said received wave signal substantially by the value of said oscillatory frequency to derive in said system from said received wave signal and said heterodyne wave signal by virtue of said nonlinear characteristic a wave signal having substantially said oscillatory frequency, whereby said superregenerative circuit effects superregenerative amplification of wave signals having substantially said oscillatory frequency; said system including an electron tube in said portion of said system and having input electrodes exhibiting undesirable variations in the input impedance thereof during the oscillatory interval of said superregenerative circuit, whereby said undesirable variations in said input impedance undesirably tend to modulate said heterodyne wave signal thereby producing by back conversion wave-signal energy having substantially the frequency of said received wave signal; and a cathode resistor for said electron tube responsive to the operation of said superregenerative circuit during said oscillatory interval and unby-passed for space currents of said electron tube having a frequency substantially that of said received wave signal for reducing said undesirable variations in said input impedance during said oscillatory interval, thereby substantially to reduce said wave-signal energy produced by back conversion.

2. A superregenerative superheterodyne wave-signal receiver comprising: a superregenerative superheterodyne system having a nonlinear wave-signal translating characteristic and including a superregenerative circuit having an oscillatory frequency different from that of a received wave signal applied to said system; quench means coupled to said superregenerative circuit for applying thereto a quench signal which produces alternate positive and negative conductance variations therein and effects superregenerative amplification; an oscillator coupled to the portion of said system having said characteristic and having parameters so proportioned as to apply to said system a heterodyne wave signal having a frequency differing from that of said received wave signal substantially by the value of said oscillatory frequency to derive in said system from said received wave signal and said heterodyne wave signal by virtue of said nonlinear characteristic a wave signal having substantially said oscillatory frequency, whereby said superregenerative circuit effects superregenerative amplification of wave signals having substantially said oscillatory frequency; said system having an input circuit coupled to said portion of said system and exhibiting undesirable variations in the input impedance thereof during the oscillatory interval of said superregenerative circuit, whereby said undesirable variations in said input impedance undesirably tend to modulate said heterodyne wave signal thereby producing by back conversion wave-signal energy having substantially the frequency of said received wave signal; and a feed-back impedance coupled in circuit with said portion of said system and degenerative with relation to a wave signal having substantially the frequency of said received wave signal and responsive to the operation of said superregenerative circuit during said oscillatory interval for reducing said undesirable variations in said input impedance during said oscillatory interval, thereby substantially to reduce said wave-signal energy produced by back conversion.

3. A superregenerative superheterodyne wave-signal receiver comprising: a superregenerative superheterodyne system having a nonlinear wave-signal translating characteristic and including a superregenerative circuit having an oscillatory frequency different from that of a received wave signal applied to said system; quench means coupled to said superregenerative circuit for applying thereto a quench signal which produces alternate positive and negative conductance variations therein and effects superregenerative amplification; an oscillator coupled to the portion of said system having said characteristic and having parameters so proportioned as to apply to said system a heterodyne wave signal having a frequency differing from that of said received wave signal substantially by the value of said oscillatory frequency to derive in said system from said received wave signal and said heterodyne wave signal by virtue of said nonlinear characteristic a wave signal having substantially said oscillatory frequency, whereby said superregenerative circuit effects superregenerative amplification of wave signals having substantially said oscillatory frequency; said system having an input circuit coupled to said portion of said system and exhibiting undesirable variations in the input capacitance thereof during the oscillatory interval of said superregenerative circuit, whereby said undesirable variations in said input capacitance undesirably tend to modulate said heterodyne wave signal thereby producing by back conversion wave-signal energy having substantially the frequency of said received wave signal; and a feed-back impedance coupled in circuit with said portion of said system and degenerative with relation to a wave signal having substantially the frequency of said received wave signal and responsive to the operation of said superregenerative circuit during said oscillatory interval for reducing said undesirable variations in said input capacitance during said oscillatory interval, thereby substantially to reduce said wave-signal energy produced by back conversion.

4. A superregenerative superheterodyne wave-signal receiver comprising: a superregenerative superheterodyne system having a nonlinear wave-signal translating characteristic and including a superregenerative circuit having an oscillatory frequency different from that of a received wave signal applied to said system; quench means coupled to said superregenerative circuit for applying thereto a quench signal which produces alternate positive and negative conductance variations therein and effects superregenerative amplification; an oscillator coupled to the portion of said system having said characteristic and having parameters so proportioned as to apply to said system a heterodyne wave signal having a frequency differing from that of said received wave signal substantially by the value of said oscillatory frequency to derive in said system from said received wave signal and said heterodyne wave signal by virtue of said nonlinear characteristic a wave signal having substantially said oscillatory frequency, whereby said superregenerative circuit effects superregenerative amplification of wave signals having substantially said oscillatory frequency; said system having an input circuit coupled to said portion of said system and exhibiting undesirable variations in the input impedance thereof at least during the oscillatory build-up interval of said superregenerative circuit, whereby said undesirable variations in said input impedance undesirably tend to modulate said heterodyne wave signal thereby producing by back conversion wave-signal energy having substantially the frequency of said received wave signal; and a feed-back impedance coupled in circuit with said portion of said system and degenerative with relation to a wave having substantially the frequency of said received wave signal and responsive to the operation of said superregenerative circuit during at least said oscillatory build-up interval for reducing said undesirable variations in said input impedance at least during said oscillatory build-up interval, thereby substantially to reduce said wave-signal energy produced by back conversion.

5. A superregenerative superheterodyne wave-signal receiver comprising: a superregenerative superheterodyne system having a nonlinear wave-signal translating characteristic and including a superregenerative circuit having an oscillatory frequency different from that of a received wave signal applied to said system; quench means coupled to said superregenerative circuit for applying thereto a quench signal which produces alternate positive and negative conductance variations therein and effects superregenerative amplification; an oscillator coupled to the portion of said system having said characteristic and having parameters so proportioned as to apply to said system a heterodyne wave signal having a frequency differing from that of said received wave signal substantially by the value of said oscillatory frequency to derive in said system from said received wave signal and said heterodyne wave signal by virtue of said nonlinear characteristic a wave signal having substantially said oscillatory frequency, whereby said superregenerative circuit effects superregenerative amplification of wave signals having substantially said oscillatory frequency; said system including an electron tube in said portion of said system and having input electrodes exhibiting undesirable variations in the input impedance thereof during the oscillatory interval of said superregenerative circuit, whereby said undesirable variations in said input impedance undesirably tend to modulate said heterodyne wave signal thereby producing by back conversion wave-signal energy having substantially the frequency of said received wave signal; and a feed-back impedance coupled in circuit with said portion of said system and degenerative with relation to a wave signal having substantially the frequency of said received wave signal and responsive to the instantaneous value of space current of said electron tube during said oscillatory interval for reducing said undesirable variations in said input impedance during said oscillatory interval, thereby substantially to reduce said wave-signal energy produced by back conversion.

6. A superregenerative superheterodyne wave-signal receiver comprising: a superregenerative superheterodyne system having a nonlinear wave-signal translating characteristic and including a superregenerative circuit for operation in the saturation-level mode and having an oscillatory frequency different from that of a received wave signal applied to said system; quench means coupled to said superregenerative circuit for applying thereto a quench signal which produces alternate positive and negative conductance variations therein and effects superregenerative amplification; an oscillator coupled to the portion of said system having said characteristic and having parameters so proportioned as to apply to said system a heterodyne wave signal having a frequency differing from that of said received wave signal substantially by the value of said oscillatory frequency to derive in said system from said received wave signal and said heterodyne wave signal by virtue of said nonlinear characteristic a wave signal having substantially said oscillatory frequency, whereby said superregenerative circuit effects superregenerative amplification of wave signals having substantially said oscillatory frequency; said system having an input circuit coupled to said portion of said system and exhibiting undesirable variations in the input impedance thereof during the oscillatory interval of said superregenerative circuit, whereby said undesirable variations in said input impedance undesirably tend to modulate said heterodyne wave signal thereby producing by back conversion wave-signal energy having substantially the frequency of said received wave signal; and a feed-back impedance coupled in circuit with said portion of said system and degenerative with relation to a wave signal having substantially the frequency of said received wave signal and responsive to the operation of said superregenerative circuit during said oscillatory interval for reducing said undesirable variations in said input impedance during said oscillatory interval, thereby substantially to reduce said wave-signal energy produced by back conversion.

7. A superregenerative superheterodyne wave-signal receiver comprising: a superregenerative superheterodyne system having a nonlinear wave-signal translating characteristic and including a self-quench superregenerative circuit having an oscillatory frequency different from that of a received wave signal applied to said system; an oscillator coupled to the portion of said system having said characteristic and having parameters so proportioned as to apply to said system a heterodyne wave signal having a frequency differing from that of said received wave signal substantially by the value of said oscillatory frequency to derive in said system from said received wave signal and said heterodyne wave signal by virtue of said nonlinear characteristic a wave signal having substantially said oscillatory frequency, whereby said superregenerative circuit effects superregenerative amplification of wave signals having substantially said oscillatory frequency; said system having an input circuit coupled to said portion of said system and exhibiting undesirable variations in the input impedance thereof during the oscillatory interval of said superregenerative circuit, whereby said undesirable variations in said input impedance undesirably tend to modulate said heterodyne wave signal thereby producing by back conversion wave-signal energy having substantially the frequency of said received wave signal; and a feedback impedance coupled in circuit with said portion of said system and degenerative with relation to a wave signal having substantially the frequency of said received wave signal and responsive to the operation of said superregenerative circuit during said oscillatory interval for reducing said undesirable variations in said input impedance during said oscillatory interval, thereby substantially to reduce said wave-signal energy produced by back conversion.

8. A superregenerative superheterodyne wave-signal receiver comprising: a superregenerative circuit having an oscillatory frequency different from that of a received wave signal applied thereto; quench means coupled to said superregenerative circuit for applying thereto a quench signal which produces alternate positive and negative conductance variations therein and effects superregenerative amplification; said superregenerative circuit including a regenerator tube having input electrodes exhibiting undesirable variations in the input impedance thereof during the oscillatory interval of said superregenerative circuit; an oscillator coupled to said regenerator tube and having parameters so proportioned as to apply to said circuit a heterodyne wave signal having a frequency differing from that of said received wave signal substantially by the value of said oscillatory frequency to derive in said circuit from said received wave signal and said heterodyne wave signal a wave signal having substantially said oscillatory frequency, whereby said superregenerative circuit effects superregenerative amplification of wave signals having substantially said oscillatory frequency; and a feed-back impedance coupled to said regenerator tube and degenerative with relation to the space current thereof having substantially the frequency of said received wave signal and responsive to the operation of said superregenerative circuit during said oscillatory interval for reducing said undesirable variations in said input impedance during said oscillatory interval, thereby substantially to reduce the undesirable back conversion producing wave-signal energy having substantially the frequency of said received wave signal.

9. A superregenerative superheterodyne wave-signal receiver comprising: a superregenerative superheterodyne system having a nonlinear wave-signal translating characteristic and including a superregenerative circuit having an oscillatory frequency different from that of a received wave signal; quench means coupled to said superregenerative circuit for applying thereto a quench signal which produces alternate positive and negative conductance variations therein and effects superregenerative amplification; an antenna circuit; a resonant circuit resonant at a frequency substantially that of said received wave signal for coupling said antenna circuit to said system; said superregenerative circuit including a regenerator tube having input electrodes exhibiting undesirable variations in the input impedance thereof during the oscillatory interval of said superregenerative circuit; an oscillator coupled to the portion of said system having said characteristic and having parameters so proportioned as to apply to said system a heterodyne wave signal having a frequency differing from that of said received wave signal substantially by the value of said oscillatory frequency to derive in said system from said received wave signal and said heterodyne wave signal by virtue of said nonlinear characteristic a wave signal having substantially said oscillatory frequency, whereby said superregenerative circuit effects superregenerative amplification of wave signals having substantially said oscillatory frequency; and a feed-back impedance coupled in circuit with said portion of said system and degenerative with relation to a wave signal having substantially the frequency of said received wave signal and responsive to the operation of said superregenerative circuit during said oscillatory interval for reducing said undesirable variations in said input impedance during said oscillatory interval, thereby substantially to reduce the undesirable back conversion producing wave-signal energy having substantially the frequency of said received wave signal and subject to be coupled by said resonant circuit to said antenna circuit.

10. A superregenerative superheterodyne wave-signal receiver comprising: a superregenerative superheterodyne system having a nonlinear wave-signal translating characteristic and including a superregenerative circuit having a predetermined quench frequency and having an oscillatory frequency different from that of a received wave signal applied to said system; an oscillator coupled to the portion of said system having said characteristic and having parameters so proportioned as to apply to said system a heterodyne wave signal having a frequency differing from that of said received wave signal substantially by the value of said oscillatory frequency to derive in said system from said received wave signal and said heterodyne wave signal by virtue of said nonlinear characteristic a wave signal having substantially said oscillatory frequency, whereby said superregenerative circuit effects superregenerative amplification of wave signals having substantially said oscillatory frequency; said system having an input circuit coupled to said portion of said system and exhibiting undesirable variations in the input impedance thereof during the oscillatory interval of said superregenerative circuit, whereby said undesirable variations in said input impedance undesirably tend to modulate said heterodyne wave signal thereby producing by back conversion wave-signal energy having substantially the frequency of said received wave signal; a feed-back impedance coupled in circuit with said portion of said system and degenerative with relation to a wave signal having substantially the frequency of said received wave signal and responsive to the operation of said superregenerative circuit during said oscillatory interval for reducing said undesirable variations in said input impedance during said oscillatory interval, thereby substantially to reduce said wave-signal energy produced by back conversion; and a choke coil coupled across said feed-back impedance and having a low-impedance value for signal components having substantially the frequency of said quench frequency and a high-impedance value for signal components having substantially the frequency of said received wave signal.

BERNARD D. LOUGHLIN.

(References on following page)

REFERENCES CITED

The following references are of record in the file of this patent:

UNITED STATES PATENTS

| Number | Name | Date |
|---|---|---|
| 1,788,078 | Balsley | Jan. 6, 1931 |
| 1,917,113 | Gunther | July 4, 1933 |
| 2,049,777 | Mountjoy | Aug. 4, 1936 |
| 2,100,605 | Linsell | Nov. 30, 1937 |
| 2,106,229 | Sinninger | Jan. 25, 1938 |
| 2,115,858 | Keall | May 3, 1938 |
| 2,183,610 | Foster | Dec. 19, 1939 |
| 2,280,521 | Foster | Apr. 21, 1942 |
| 2,396,439 | Schlesinger | Mar. 12, 1946 |
| 2,400,822 | Hansell | May 21, 1946 |
| 2,410,768 | Worcester | Nov. 5, 1946 |
| 2,476,607 | Kent | July 19, 1949 |
| 2,481,852 | Loughlin | Sept. 13, 1949 |
| 2,537,132 | Guanella | Jan. 9, 1951 |

OTHER REFERENCES

"Some Notes on Superregeneration with Particular Emphasis on its Possibilities for Frequency Modulation," by Kalmus, Proc. IRE, vol. 32, No. 10, October, 1944.